US 6,575,211 B2

(12) United States Patent
Preuss

(10) Patent No.: US 6,575,211 B2
(45) Date of Patent: Jun. 10, 2003

(54) RETURN CONVEYOR BELT SYSTEM

(76) Inventor: Michael A. Preuss, 102 S. Main St. P.O. Box 184, Belview, MN (US) 56214

( * ) Notice: Subject to any disclaimer, the term of this patent is extended or adjusted under 35 U.S.C. 154(b) by 0 days.

(21) Appl. No.: 09/919,640

(22) Filed: Jul. 31, 2001

(65) Prior Publication Data

US 2003/0024362 A1 Feb. 6, 2003

(51) Int. Cl.[7] .............................................. B27B 31/00
(52) U.S. Cl. ................. 144/242.1; 144/356; 144/245.1; 44/15
(58) Field of Search ........................ 414/15; 144/242.1, 144/356, 245.1

(56) References Cited

U.S. PATENT DOCUMENTS

| | | | |
|---|---|---|---|
| 3,662,798 A | | 5/1972 | Campbell |
| 3,687,178 A | * | 8/1972 | Golick et al. ................. 83/107 |
| 4,196,648 A | | 4/1980 | Jones |
| 4,253,361 A | * | 3/1981 | Pryor et al. .................. 144/378 |
| 4,386,641 A | * | 6/1983 | Horn ....................... 144/245.2 |
| 4,468,992 A | * | 9/1984 | McGeehee .................. 144/378 |
| 4,596,172 A | * | 6/1986 | Visser .......................... 83/210 |
| 4,823,662 A | * | 4/1989 | Stolzer ........................ 83/150 |
| 4,881,584 A | * | 11/1989 | Wislocker et al. ........ 144/245.2 |
| 4,907,337 A | * | 3/1990 | Krusi .......................... 144/2.1 |
| 5,249,491 A | | 10/1993 | Carter |
| 5,251,142 A | * | 10/1993 | Cramer ........................ 700/171 |
| 5,353,910 A | | 10/1994 | Harris |
| 5,365,812 A | | 11/1994 | Harnden |
| 5,368,080 A | | 11/1994 | Hamel |
| 5,417,265 A | * | 5/1995 | Davenport et al. ...... 144/242.1 |
| 5,889,675 A | | 3/1999 | Minami |
| 5,992,484 A | | 11/1999 | Jackson |
| 6,173,829 B1 | * | 1/2001 | Jackson et al. .......... 144/242.1 |

* cited by examiner

Primary Examiner—Paul T. Sewell
Assistant Examiner—Nini F. Legesse
(74) Attorney, Agent, or Firm—Michael S. Neustel

(57) ABSTRACT

A return conveyor belt system for conveniently returning ripped lumber to an individual after being ripped. The return conveyor belt system includes a table having an upper surface, a manipulating member slidably positioned upon the table and mechanically connected to a drive motor, a conveyor pivotally attached to the table, a control unit for controlling the drive motor and the conveyor, and a sensor positioned upon the conveyor for sensing a piece of lumber. A saw positioned adjacent to the table delivers ripped lumber upon the upper surface of the table where after the manipulating member forces the ripped lumber either onto the conveyor or away from the conveyor. The ripped lumber is transported towards the operator until a sensor detects the lumber thereby terminating movement of the conveyor. The operator is then able to remove the ripped lumber from the conveyor.

20 Claims, 16 Drawing Sheets

RETURN CONVEYOR BELT SYSTEM

| Index of Elements for Conveyor Belt System |
| --- |
| ENVIRONMENTAL ELEMENTS |
| 10. Return Conveyor Belt System |
| 11. |
| 12. Piece of Lumber |
| 13. |
| 14. Ripped Segments |
| 15. |
| 16. |
| 17. |
| 18. |
| 19. |
| 20. Saw |
| 21. |
| 22. Blades |
| 23. |
| 24. |
| 25. |
| 26. |
| 27. |
| 28. |
| 29. |
| 30. Table |
| 31. |
| 32. Upper Surface |
| 33. |
| 34. Hinge |
| 35. |
| 36. Side Slots |
| 37. |
| 38. |
| 39. |
| 40. Manipulating Member |
| 41. |
| 42. Arms |
| 43. |
| 44. |
| 45. |
| 46. |
| 47. |
| 48. |
| 49. |
| 50. Drive Shaft |
| 51. |
| 52. Motor |
| 53. |
| 54. Drive Chain |
| 55. |
| 56. Sheath |
| 57. Access Slot |
| 58. Control Chain |
| 59. Sprocket |
| 60. Conveyor |
| 61. |
| 62. Belt |
| 63. |
| 64. Control Unit |
| 65. |
| 66. Wheels |
| 67. |
| 68. |
| 69. |
| 70. Sensor |
| 71. |
| 72. |
| 73. |
| 74. |
| 75. |
| 76. |
| 77. |
| 78. |
| 79. |

BACKGROUND OF THE INVENTION

1. Field of the Invention

The present invention relates generally to conveyors and more specifically it relates to a return conveyor belt system for conveniently returning ripped lumber to an individual after being ripped.

2. Description of the Prior Art

Examples of patented devices that relate to the present invention are U.S. Pat. No. 5,992,484 to Jackson; U.S. Pat. No. 5,368,080 to Hamel; U.S. Pat. No. 3,662,798 to Campbell; U.S. Pat. No. 5,249,491 to Carter; U.S. Pat. No. 4,196,648 to Jones; U.S. Pat. No. 5,353,910 to Harris; U.S. Pat. No. 5,365,812 to Harnden; and U.S. Pat. No. 5,889,675 to Minami.

While these devices may be suitable for the particular purpose to which they address, they are not as suitable for manipulating ripped lumber that exits a ripsaw. Conventional conveyor devices are difficult to utilize and are unsafe to operate for workers.

In these respects, the return conveyor belt system according to the present invention substantially departs from the conventional concepts and designs of the prior art, and in so doing provides an apparatus primarily developed for the purpose of conveniently returning ripped lumber to an individual after being ripped.

SUMMARY OF THE INVENTION

In view of the foregoing disadvantages inherent in the known types of conveyors now present in the prior art, the present invention provides a new return conveyor belt system construction wherein the same can be utilized for conveniently returning ripped lumber to an individual after being ripped.

The general purpose of the present invention, which will be described subsequently in greater detail, is to provide a new return conveyor belt system that has many of the advantages of the conveyors and lumber manipulating devices mentioned heretofore and many novel features that result in a new return conveyor belt system which is not anticipated, rendered obvious, suggested, or even implied by any of the prior art conveyors, either alone or in any combination thereof.

To attain this, the present invention generally comprises a table having an upper surface, a manipulating member slidably positioned upon the table and mechanically connected to a drive motor, a conveyor pivotally attached to the table, a control unit for controlling the drive motor and the conveyor, and a sensor positioned upon the conveyor for sensing a piece of lumber. A saw positioned adjacent to the table delivers ripped lumber upon the upper surface of the table where after the manipulating member forces the ripped lumber either onto the conveyor or away from the conveyor. The ripped lumber is transported towards the operator until a sensor detects the lumber thereby terminating movement of the conveyor. The operator is then able to remove the ripped lumber from the conveyor.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a return conveyor belt system that will overcome the shortcomings of the prior art devices.

A second object is to provide a return conveyor belt system for conveniently returning ripped lumber to an individual after being ripped.

Another object is to provide a return conveyor belt system that does not utilize roller bed conveyors.

An additional object is to provide a return conveyor belt system that allows for remote manipulation and maneuvering of ripped lumber.

A further object is to provide a return conveyor belt system that may be utilized with lumber having various sizes.

Another object is to provide a return conveyor belt system that returns ripped lumber next to the operator of the ripsaw.

A further object is to provide a return conveyor belt system that allows for the automatic offloading of undesirable edgings instead of the edgings being delivered to him.

Another object is to provide a return conveyor belt system that allows for one person operation.

A further object is to provide a return conveyor belt system that is easy and simple to utilize.

Another object is to provide a return conveyor belt system that may be utilized with various sizes and types of lumber saws including but not limited to ripsaws.

A further object is to provide a return conveyor belt system that operates in a safe manner for the operator.

Another object is to provide a return conveyor belt system that allows for the conveyor to be easily moved for allowing access to the lumber saw.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
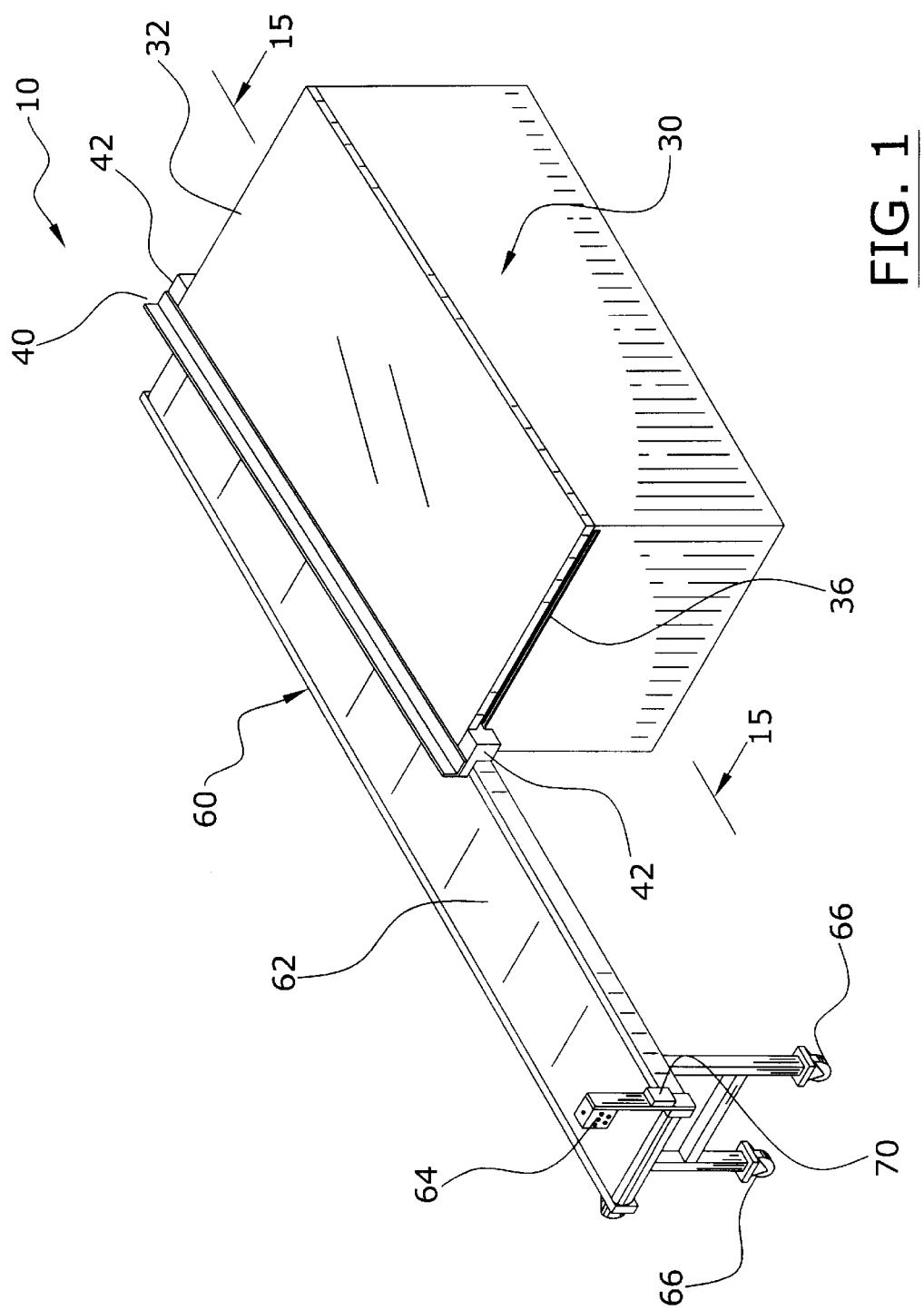
FIG. 1 is an upper perspective view of the present invention.
Figure 2:
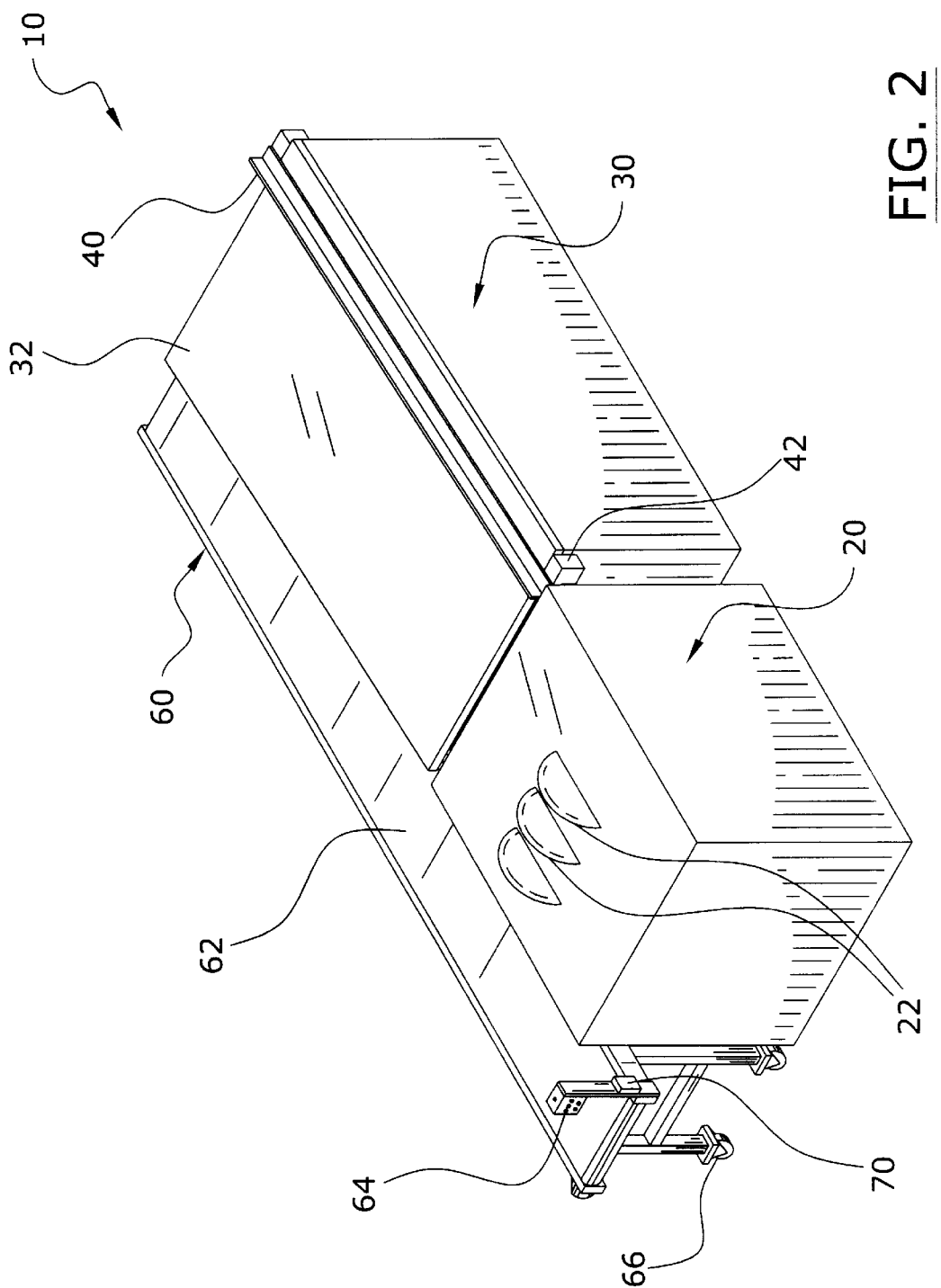
FIG. 2 is an upper perspective view of the present invention with a lumber saw positioned adjacent thereto.
Figure 3:
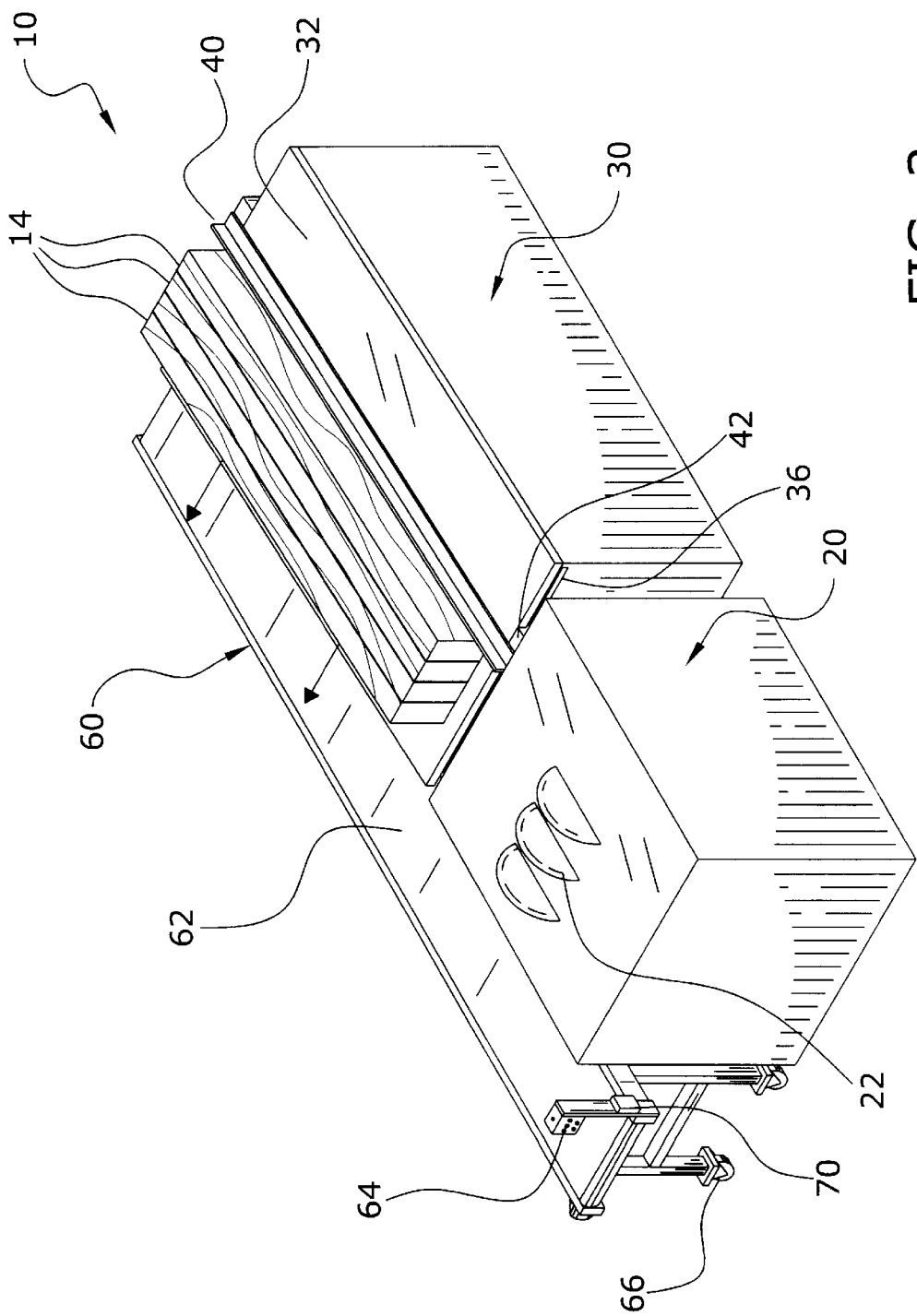
FIG. 3 is an upper perspective view illustrating ripped lumber being pushed onto the conveyor.
Figure 4:
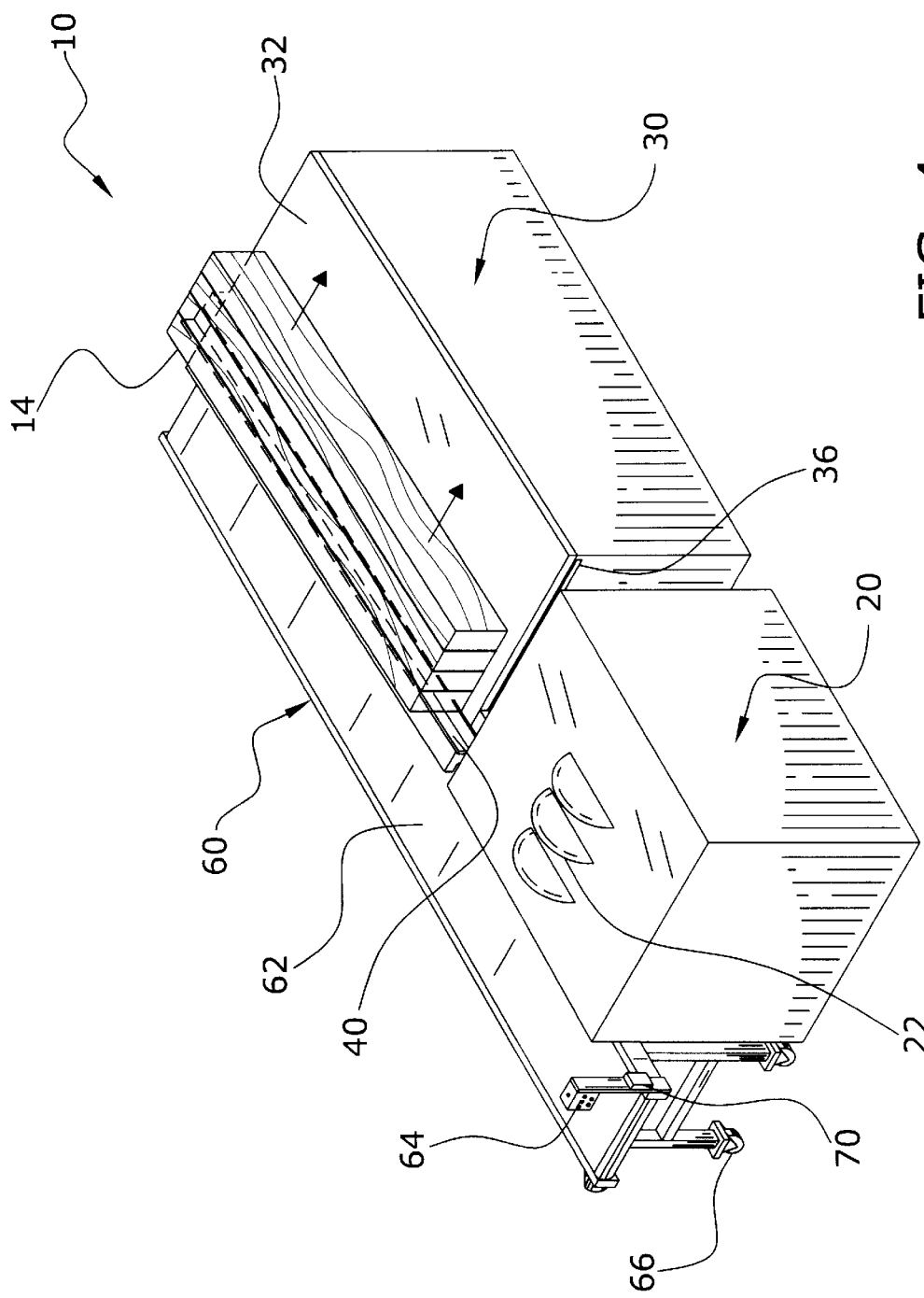
FIG. 4 is an upper perspective view illustrating ripped lumber being pushed away from the conveyor to the side of the table structure.

Turning now descriptively to the drawings, in which similar reference characters denote similar elements throughout the several views, FIGS. 1 through 16 illustrate a return conveyor belt system 10, which comprises a table 30 having an upper surface 32, a manipulating member 40 slidably positioned upon the table 30 and mechanically connected to a drive motor 52, a conveyor 60 pivotally attached to the table 30 by a hinge 34, a control unit 64 for controlling the drive motor 52 and the conveyor 60, and a sensor 70 positioned upon the conveyor 60 for sensing a piece of lumber 12. A saw 20 positioned adjacent to the table 30 delivers ripped lumber upon the upper surface 32 of the table 30 where after the manipulating member 40 forces the ripped lumber either onto the conveyor 60 or away from the conveyor 60. The ripped lumber is transported towards the operator until a sensor 70 detects the lumber thereby terminating movement of the conveyor 60. The operator is then able to remove the ripped lumber from the conveyor 60.

Figure 9:
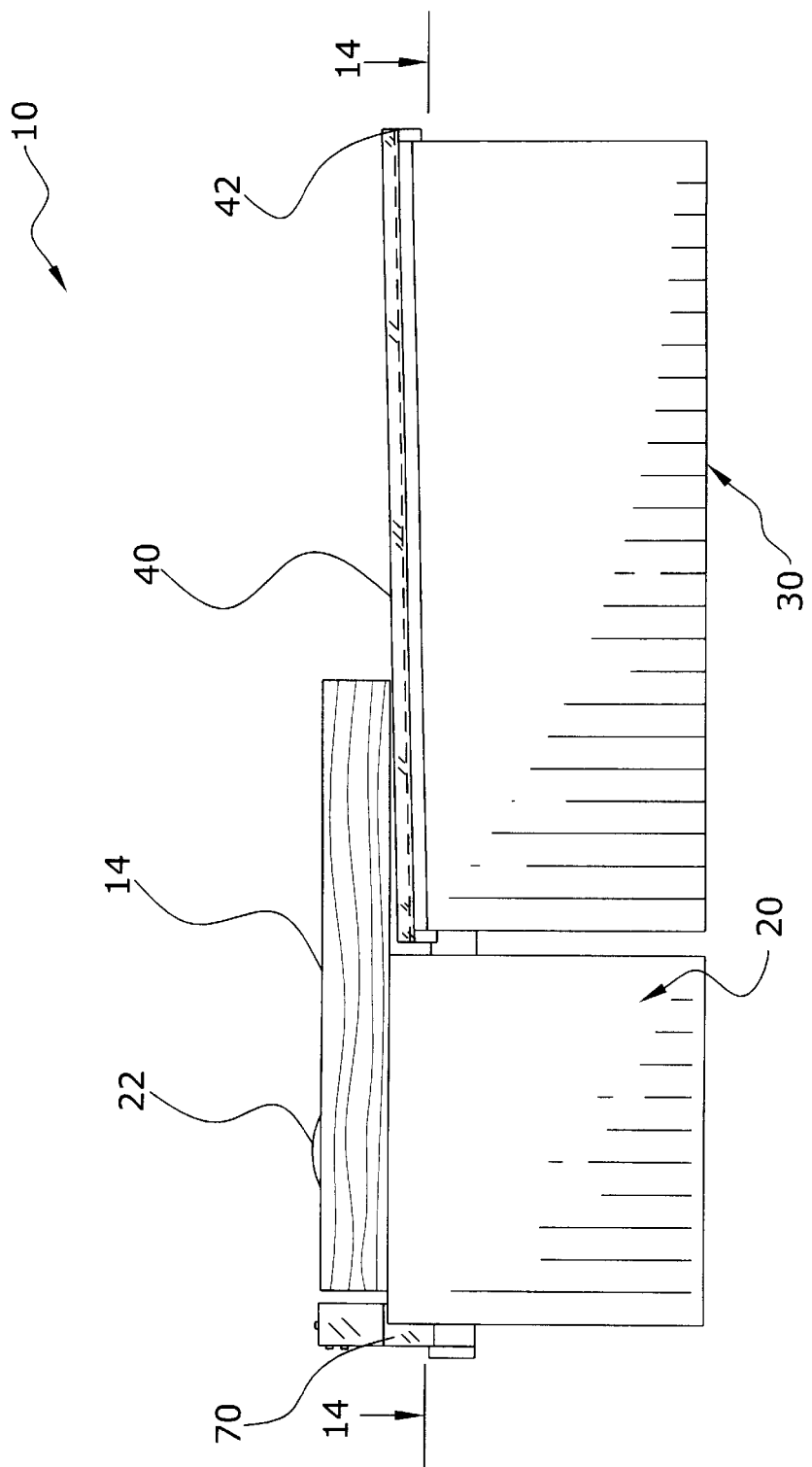
FIG. 9 is a side view of the manipulating member passing beneath the partially ripped piece of lumber.

As shown in FIGS. 1 through 5 of the drawings, the table 30 is comprised of a relatively broad structure capable of supporting an elongated piece of lumber 12. The table 30 includes an upper surface 32 that receives and supports the ripped segments 14 of the piece of lumber 12. As best shown in FIG. 9 of the drawings, the upper surface 32 of the table 30 is preferably angled downwardly toward the saw 20 for allowing the manipulating member 40 to pass beneath the ripped segments 14 of a partially ripped piece of lumber 12.

Figure 8:
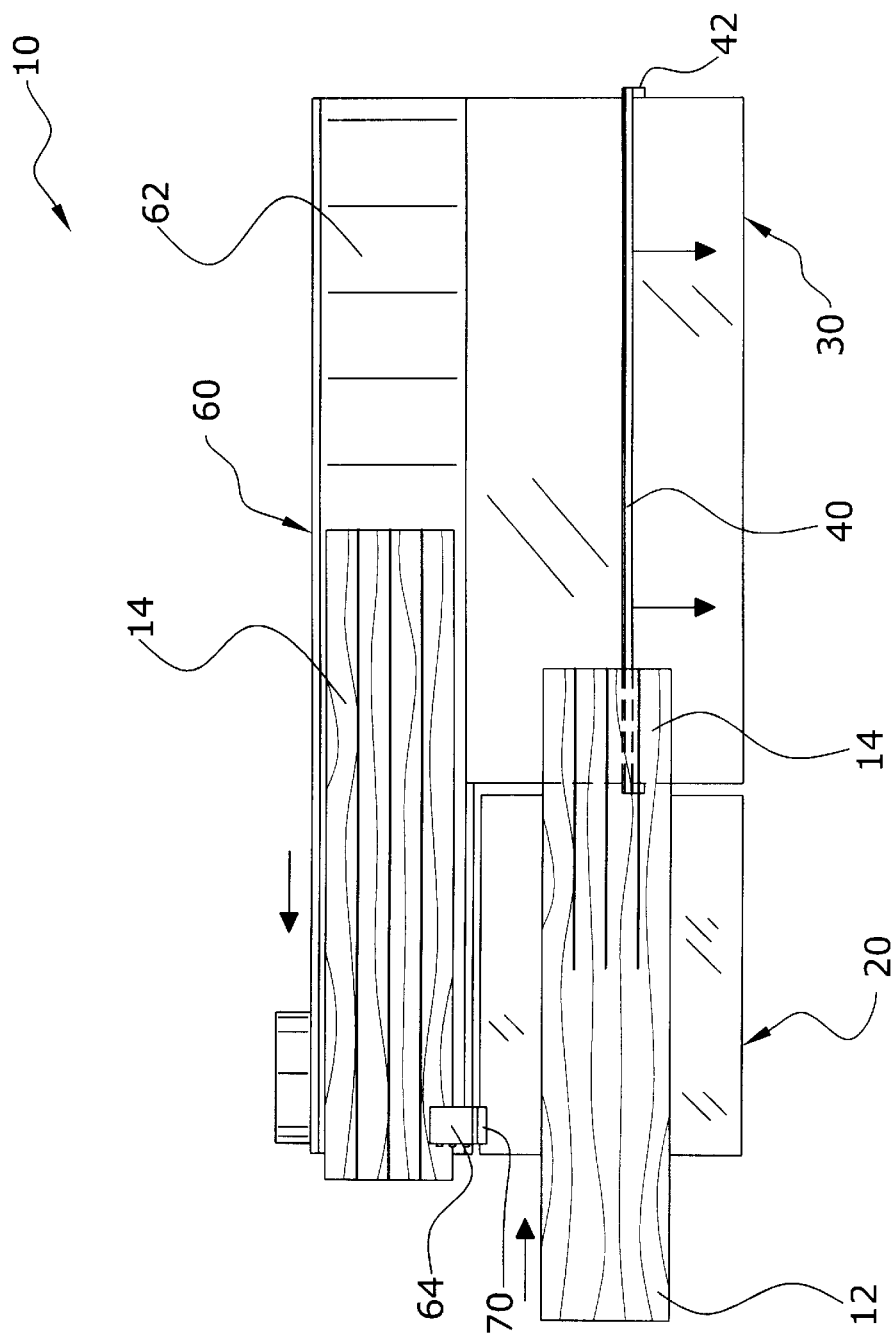
FIG. 8 is a top view of the ripped lumber positioned upon the conveyor returning to the operator while the manipulating member passes beneath the partially ripped piece of lumber.

As shown in FIGS. 1 through 13 of the drawings, the manipulating member 40 is movably positioned upon the upper surface 32 of the table 30. The manipulating member 40 may have various structure, however the manipulating member 40 preferably has a narrow vertical portion capable of extending within the kerf of the ripped segments 14 of the ripped piece of lumber 12 as illustrated in FIG. 8 of the drawings.

Figure 14:
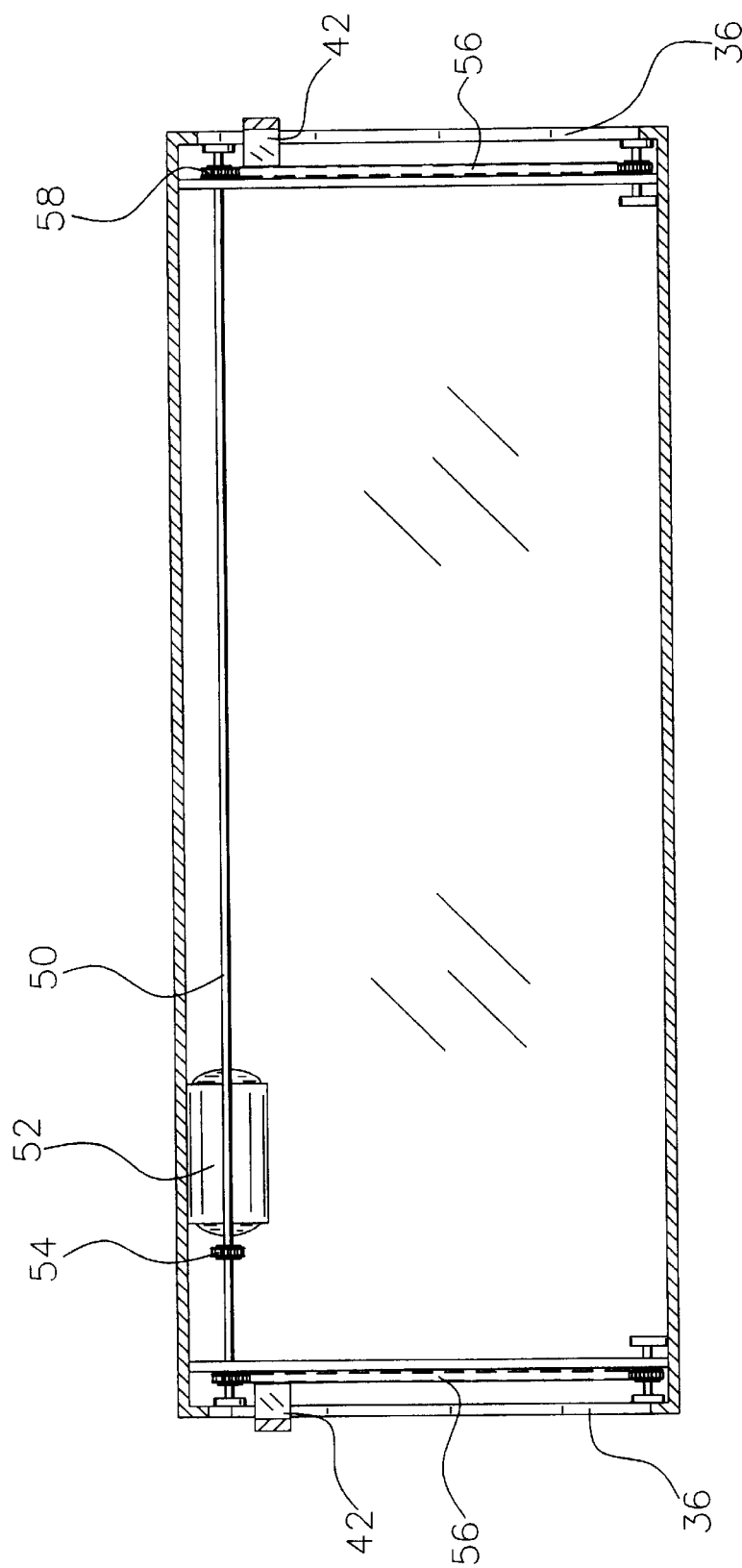
FIG. 14 is a cross sectional view taken along line 14—14 of FIG. 9 illustrating the drive means for the manipulating member.
Figure 15:
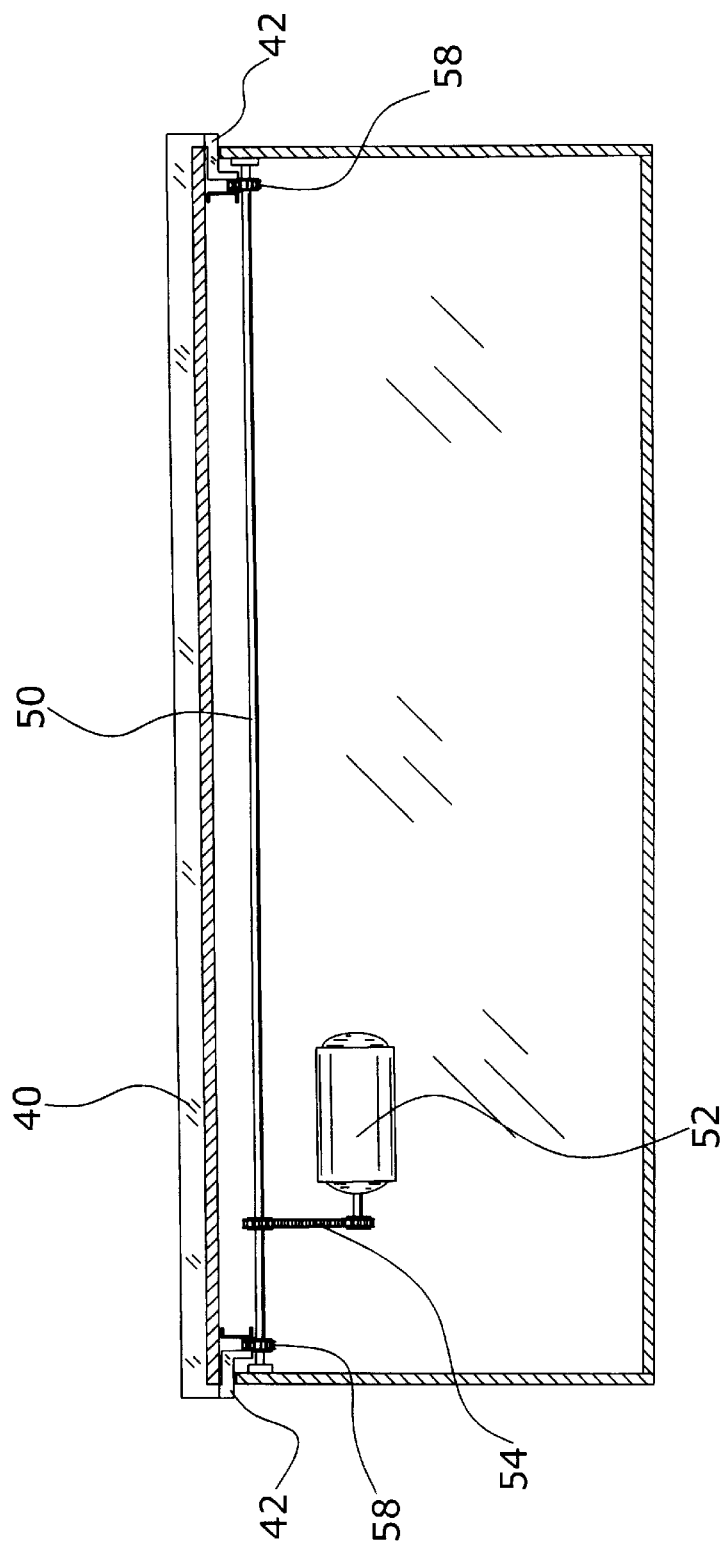
FIG. 15 is a cross sectional view taken along line 15—15 of FIG. 1 further illustrating the drive means for the manipulating member.
Figure 16:
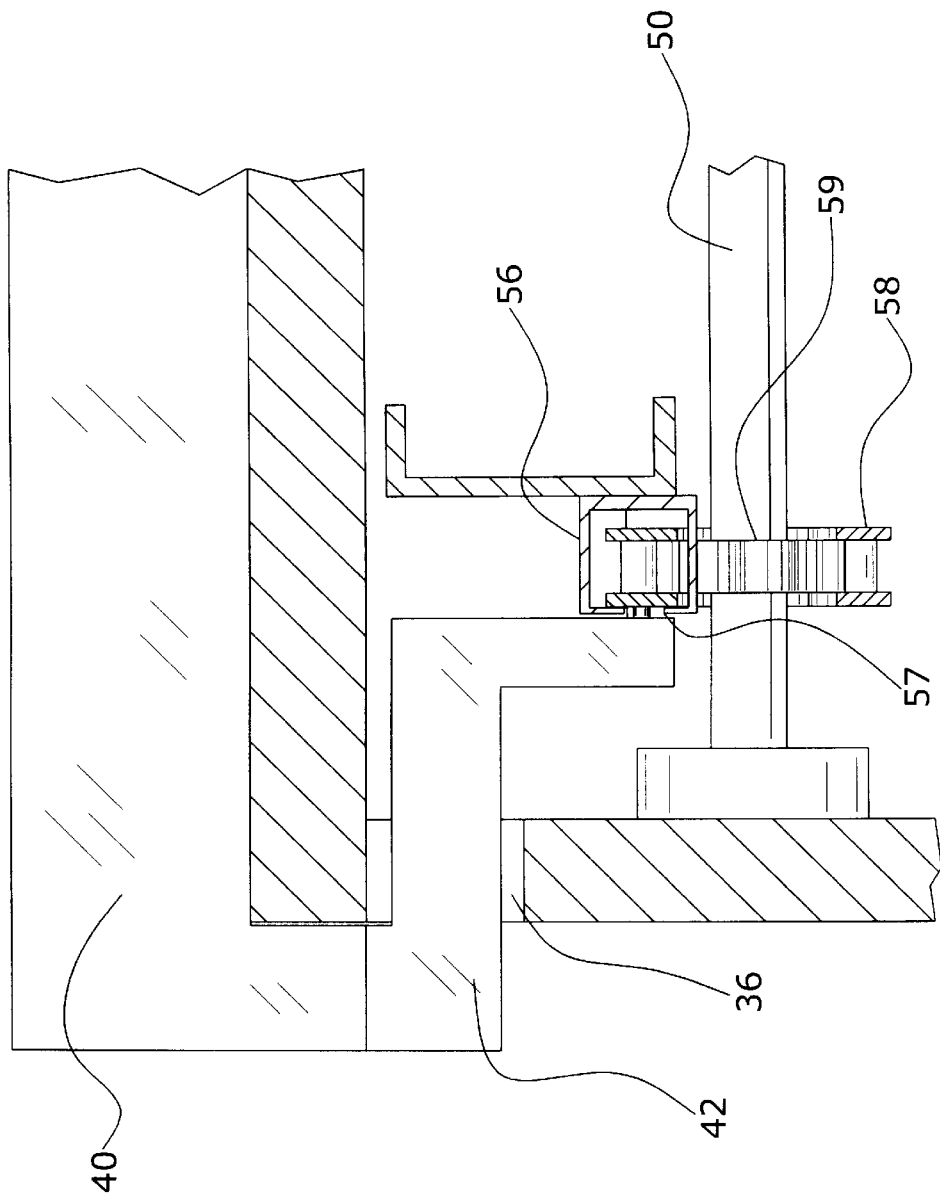
FIG. 16 is a magnified cross sectional view from FIG. 15.

The manipulating member 40 is manipulated to opposing portions of the upper surface 32 by a drive motor 52. The drive motor 52 is mechanically connected to a drive shaft 50 that is rotatably positioned within the table 30 by a drive chain 54 as best shown in FIG. 14 of the drawings. A pair of opposing sprockets 59 are attached to the distal portions of the drive shaft 50 which engage and drive a pair of corresponding control chains 58 that extend to an idler sprocket 59 as further shown in FIG. 14 of the drawings. Each control chain 58 is preferably positioned within a sheath 56 for guiding the control chain 58 and an arm 42 attached to the control chain 58. The sheath 56 is supported in a nonmovably position by a conventional bracket structure. As shown in FIGS. 14 and 15 of the drawings, a pair of arms 42 are attached to the corresponding pair of control chains 58 through an access slot 57 within the corresponding sheath 56 and extend to the distal ends of the manipulating member 40 through a pair of side slots 36 within the table 30. The drive motor 52 is in communication with the control unit 64 for either manual or automatic control of the manipulating member 40.

Figure 10:
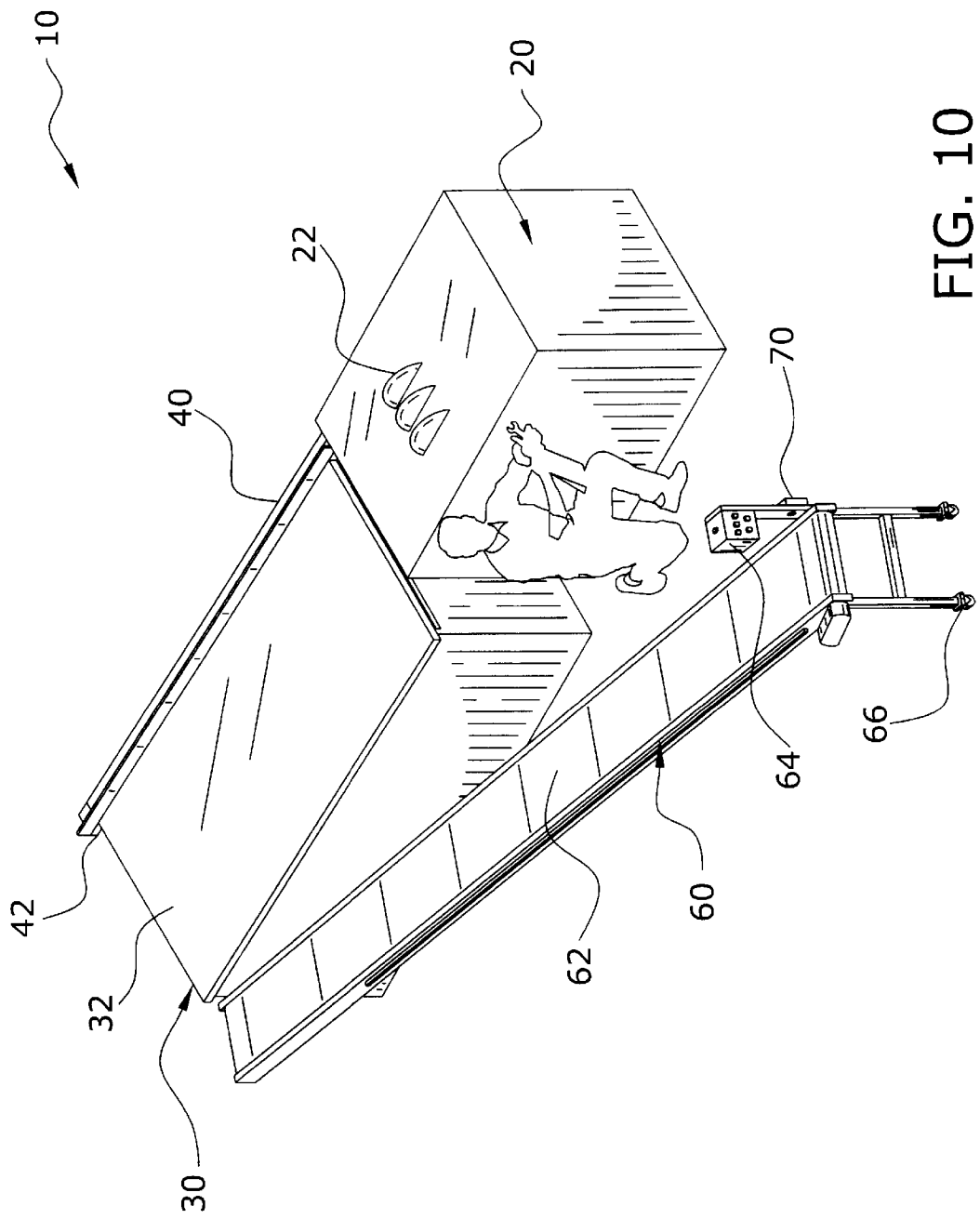
FIG. 10 is a front upper perspective view illustrating the conveyor pivoted outwardly.
Figure 11:
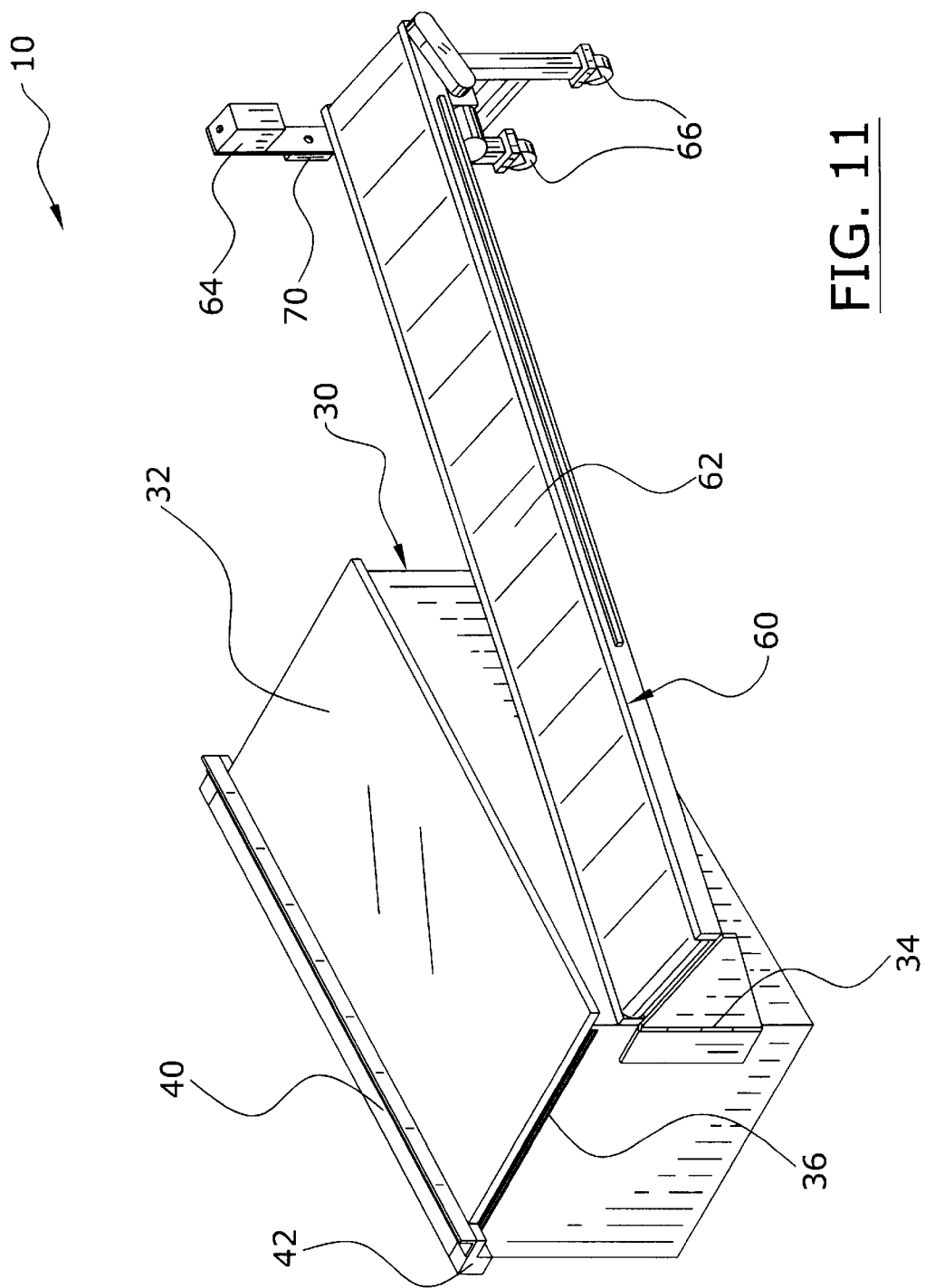
FIG. 11 is a rear upper perspective view illustrating the conveyor pivoted outwardly.
Figure 12:
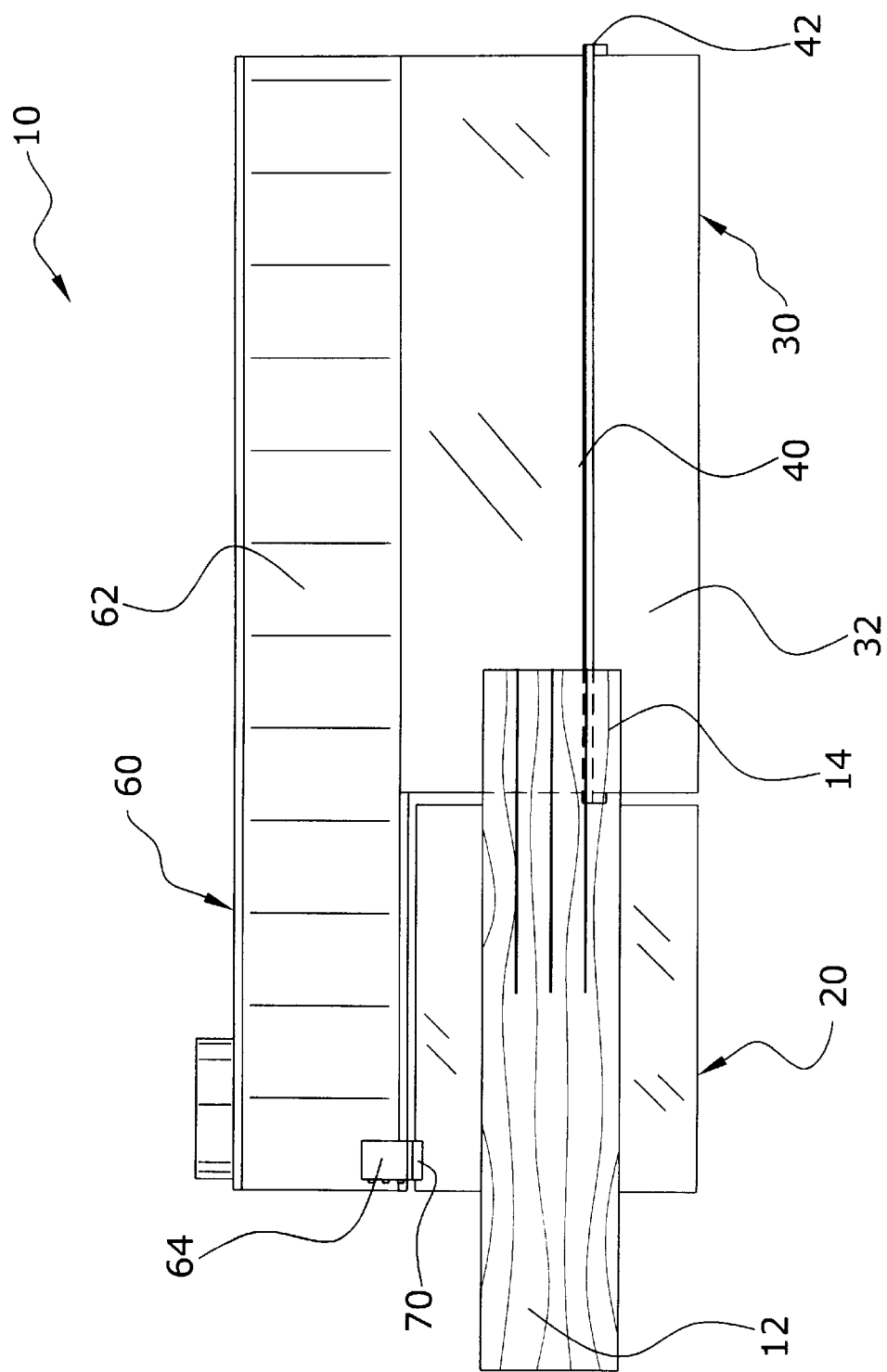
FIG. 12 is a top view illustrating the manipulating member being positioned within a kerf of the partially ripped piece of lumber thereby allowing selective engagement of the desired severed of the ripped lumber while allowing for the discarding of the undesirable portion.
Figure 13:
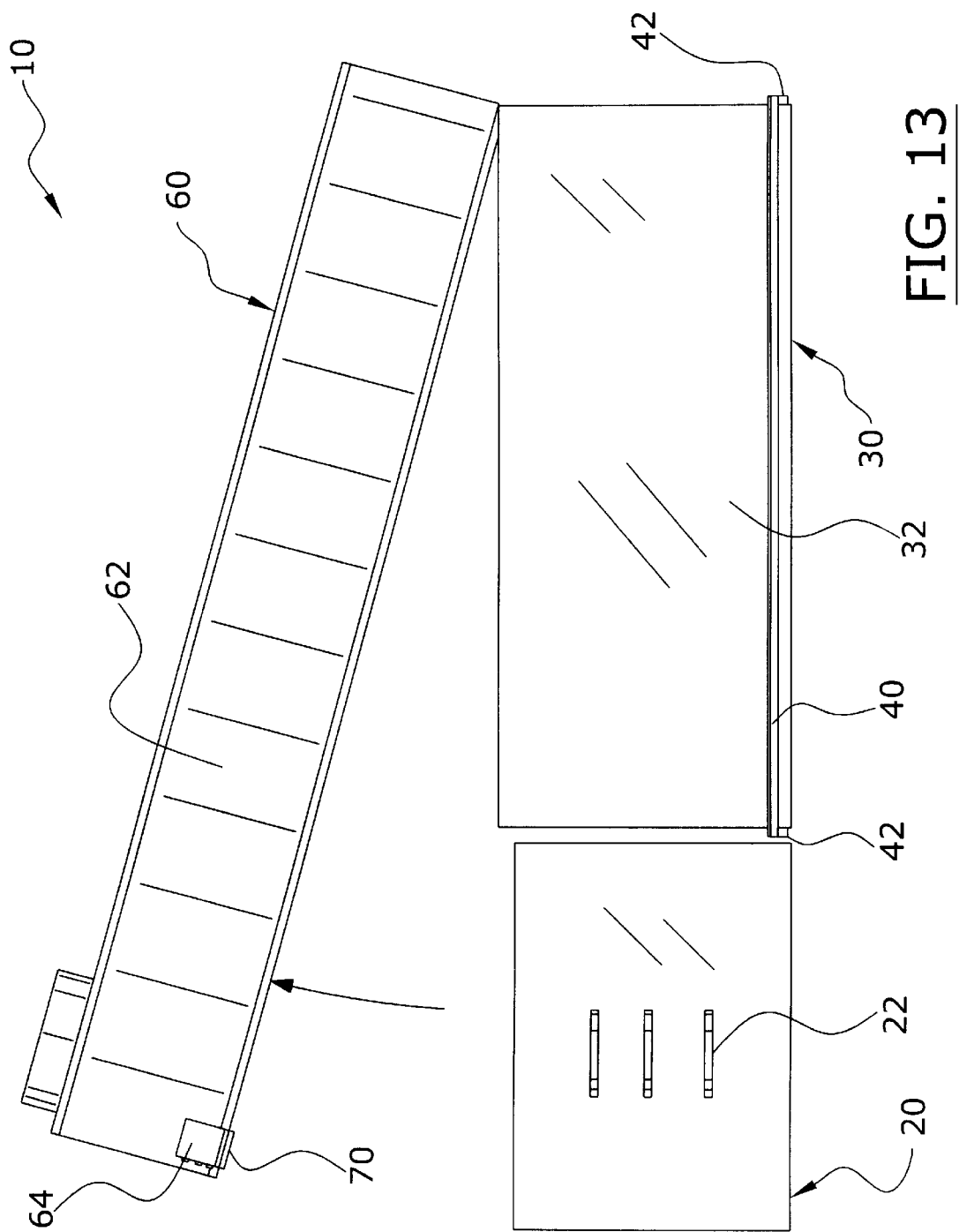
FIG. 13 is a top view illustrating the pivoting of the conveyor outwardly.

As shown in FIGS. 10 and 11 of the drawings, a conveyor 60 having a belt 62 is preferably pivotally attached to the table 30. The conveyor 60 has a plurality of legs having a corresponding plurality of wheels 66 for rotatably supporting the distal portion of the conveyor 60 thereby allowing easy pivoting of the conveyor 60 when access to the saw 20 is desired. The belt 62 of the conveyor 60 is powered by a conventional drive system and is controlled by the control unit 64. It can be appreciated that the conveyor 60 may be operated so as to return the ripped segments 14 back to the operator or in the opposite direction away from the operator to be positioned within another wood working machine or the like.

As shown in FIGS. 1 through 8 of the drawings, a sensor 70 is attached to the distal portion of the conveyor 60 and in communication with the control unit 64 for detecting the presence of a piece of lumber 12. When the piece of lumber 12 is detected by the sensor 70, the control unit 64 preferably terminates movement of the belt 62 thereby allowing the user to retrieve the piece of lumber 12 from the conveyor 60. Once the piece of lumber 12 is partially removed from the conveyor 60, the sensor 70 will no longer detect the piece of lumber 12 and will then operate the belt 62 of the conveyor 60 again. There is preferably a delay prior to operating the belt 62 of the conveyor 60 so as to prevent the conveyor 60 from manipulating the piece of lumber 12 with the distal end of the piece of lumber 12 still engaging the belt 62. The delay is preferably at least two seconds to provide for adequate removal time of the piece of the ripped segments 14 of the piece of lumber 12.

Figure 5:
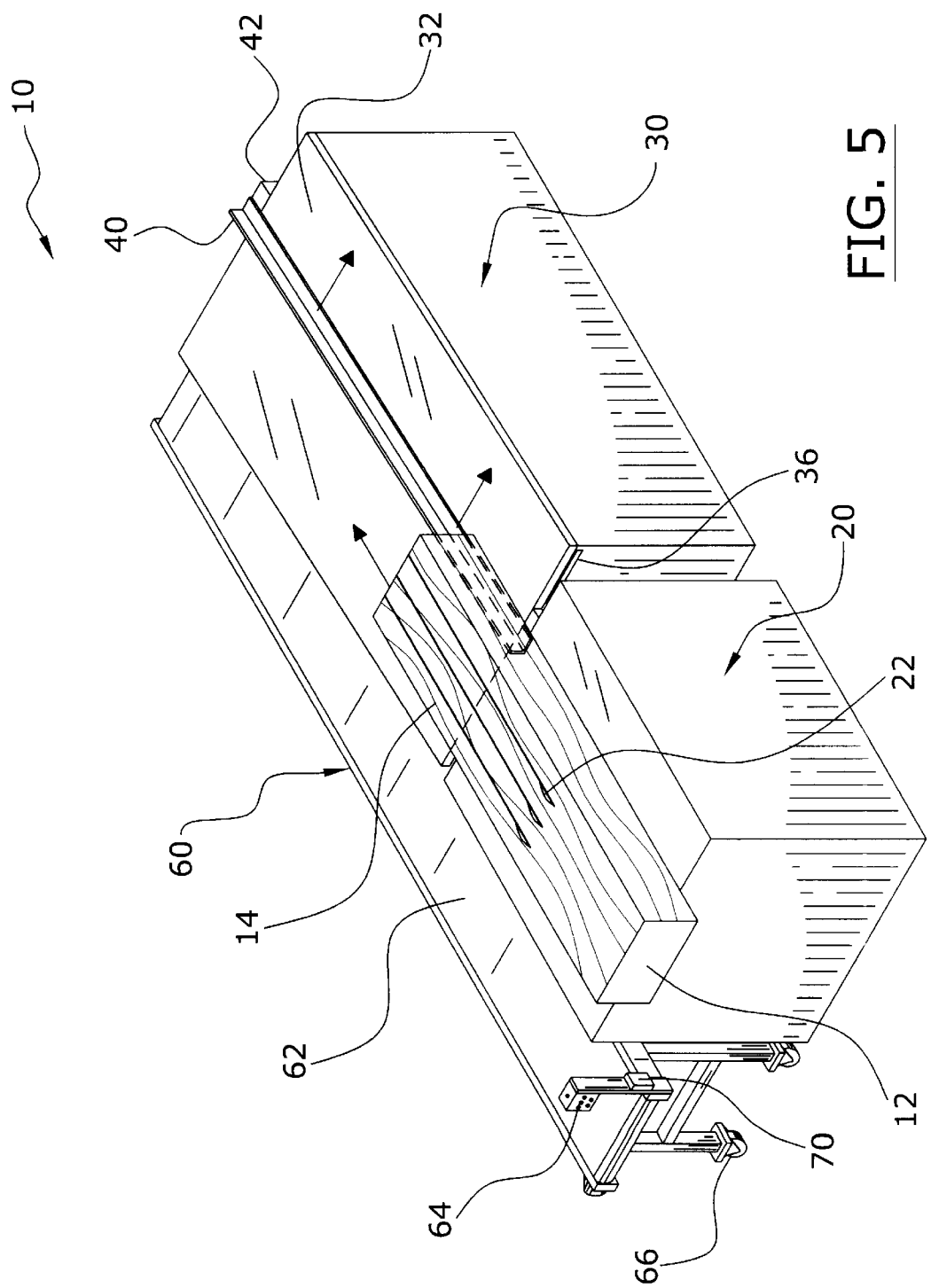
FIG. 5 is an upper perspective view illustrating a piece of lumber partially ripped with the manipulating member passing underneath the extended ripped portion thereof.
Figure 6:
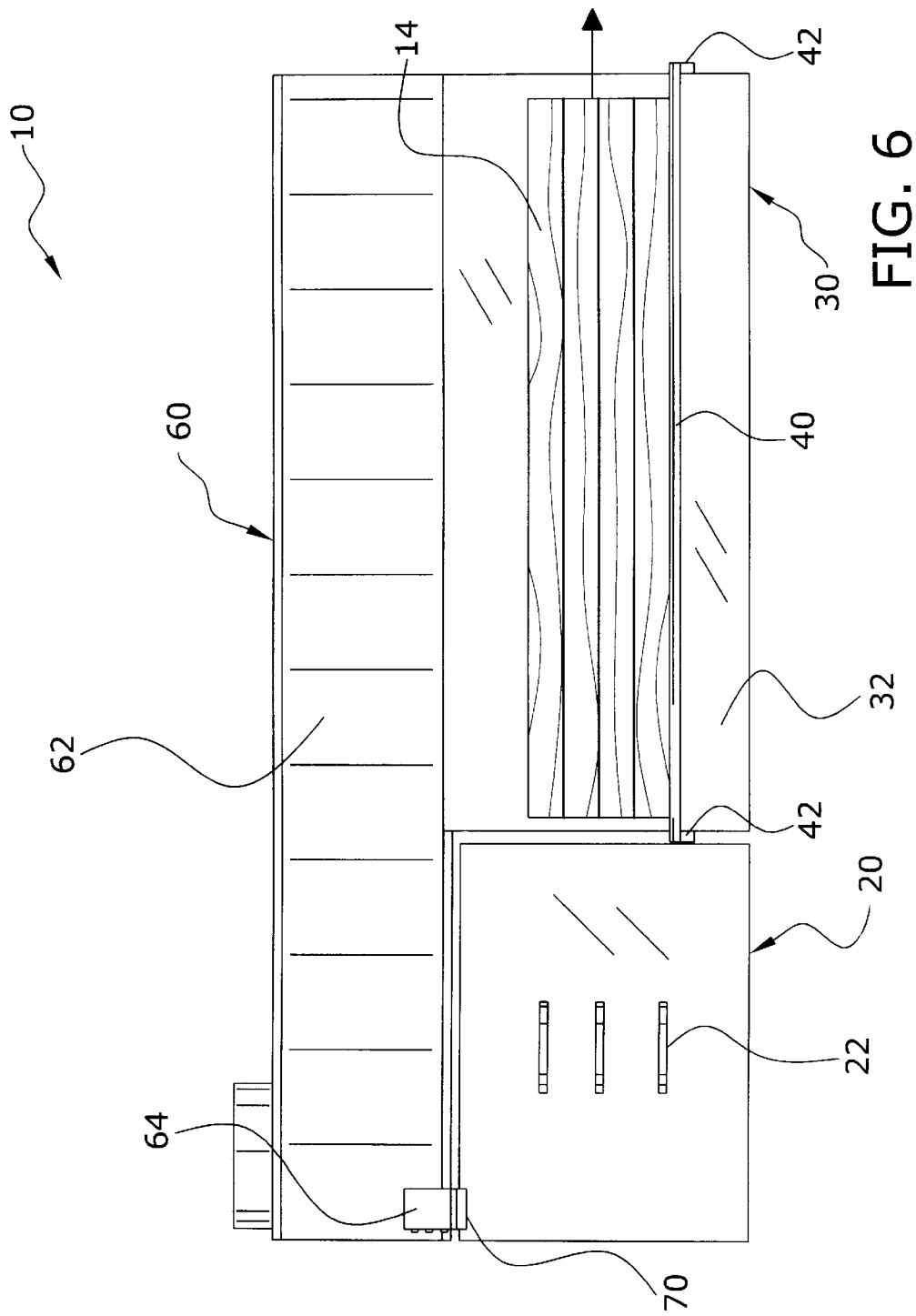
FIG. 6 is a top view illustrating the ripped lumber being positioned upon the table adjacent to the manipulating member.
Figure 7:
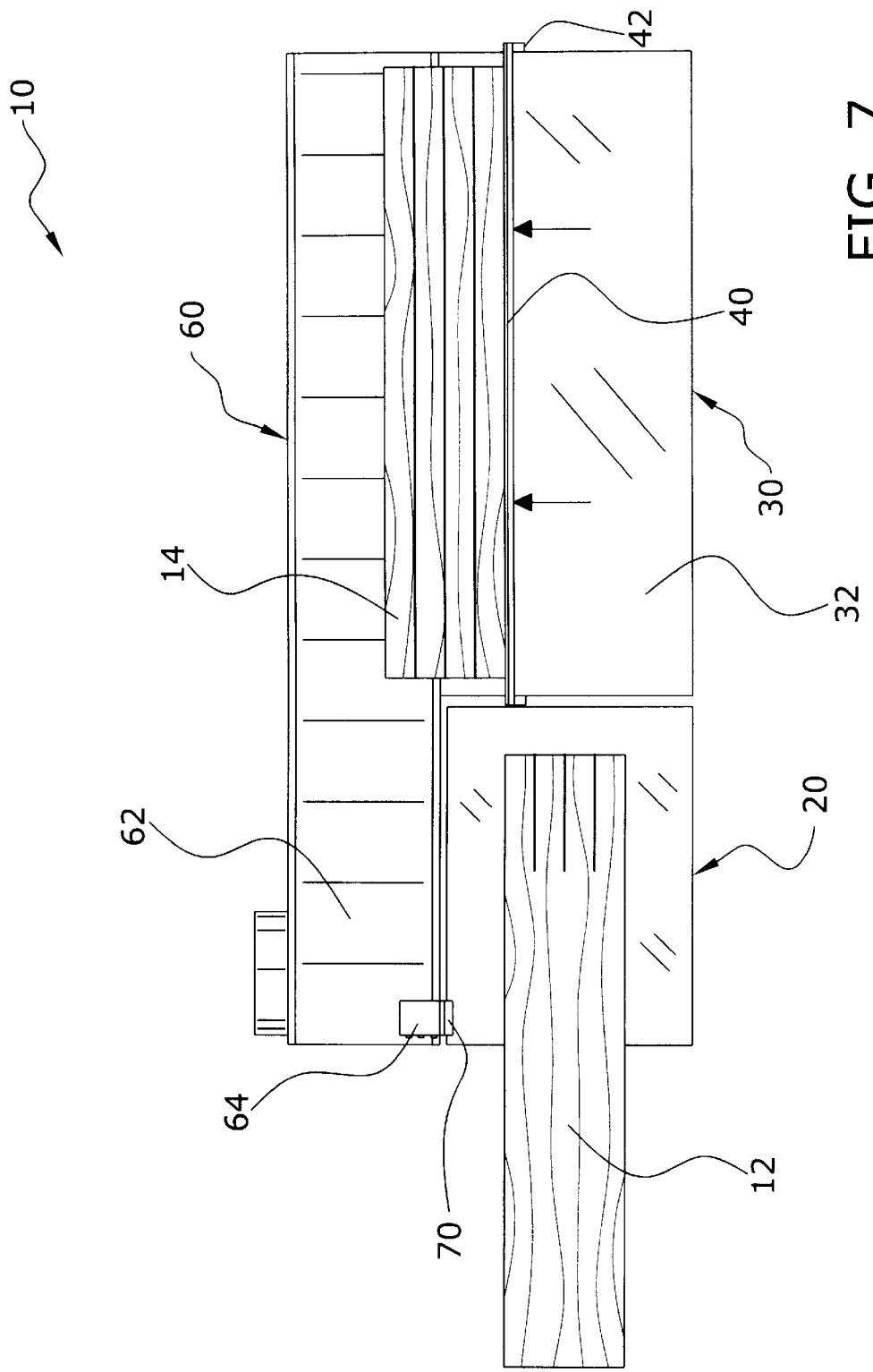
FIG. 7 is a top view illustrating the ripped lumber being pushed upon the conveyor with a second piece of lumber being ripped.

In use, the user inserts the piece of lumber 12 into the saw 20 wherein the blades 22 rip the piece of lumber 12 into a plurality of ripped segments 14 as best illustrated in FIGS. 5 and 8 of the drawings. The saw 20 may be comprised of various types of saws 20 commonly utilizing including but not limited to ripsaws. The saw 20 forces the ripped segments 14 of the piece of lumber 12 toward and onto the upper surface 32 of the table 30. Once the ripped segments 14 of the piece of lumber 12 are fully upon the upper surface 32 of the table 30, the manipulating member 40 is then operated to move the ripped segments 14 either onto the conveyor 60 or to the opposing side of the table 30. To move the manipulating member 40, the drive motor 52 manipulates the control chains 58 which drive the pair of arms 42 which slidably move the manipulating member 40 along the upper surface 32. The manipulating member 40 may be positioned so as to fit within the kerf of the ripped segments 14 of the piece of lumber 12 thereby allowing the outer portion of the piece of lumber 12 to be selectively discarded to the side of the table 30 without positioning upon the conveyor 60. The manipulating member 40 then forces and slides the plurality of ripped segments 14 on the conveyor 60 belt 62. The belt 62 of the conveyor 60 may be moving prior to or after the positioning of the ripped segments 14 upon the belt 62. The belt 62 of the conveyor 60 may be automatically operated based upon the relative position of the manipulating member 40. The ripped segments 14 are then transported along the belt 62 of the conveyor 60 rearwardly toward the operator until the sensor 70 detects the ripped segments 14. The sensor 70 sends a signal to the control unit 64 which then terminates movement of the belt 62 of the conveyor 60. The user then removes the ripped segments 14 from the conveyor 60 and thereafter the sensor 70 no longer detects the ripped segments 14 thereby allowing the control unit 64 to operate the belt 62 of the conveyor 60. As the manipulating member 40 returns back to the original position upon the upper surface 32, the operator may insert a second piece of lumber 12 to be ripped. As the second piece of lumber 12 is being ripped into ripped segments 14, the manipulating member 40 is able to pass beneath the ripped portion of the piece of lumber 12 because of the decline of the upper surface 32 toward the saw 20 as best shown in FIG. 9 of the drawings. The manipulating member 40 may then discard the undesirable portion of the piece of lumber 12 to the side and return to the original position. It can be appreciated that the manipulating member 40 may discard the undesirable portion of the piece of lumber 12 prior to moving the ripped segments 14 upon the belt 62 of the conveyor 60.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A return conveyor belt system, comprising:
   a table having an upper surface;
   a manipulating member having an elongate structure slidably extending upon said upper surface of said table;
   a means for manipulating said manipulating member;

a conveyor attached to said table for transferring ripped segments of a piece of lumber; and a control unit in communication with said means for manipulating and said conveyor;

wherein said means for manipulating said manipulating member is comprised of:

a pair of slots within said table;

a pair of arms extending within said pair of slots and attached to opposing ends of said manipulating member;

a drive shaft having a pair of drive sprockets, wherein said drive shaft is rotatably positioned within said table and a pair of idler sprockets are rotatably positioned within said table opposite of said drive shaft;

a drive motor mechanically connected to said drive shaft for rotating said drive shaft; and a pair of control chains extending about said pair of drive sprockets and said pair of idler sprockets, wherein said pair of control chains are connected to said pair of arms.

2. The return conveyor belt system of claim 1, wherein said conveyor is pivotally attached to said table and said conveyor includes a plurality of legs with a corresponding plurality of wheels attached to a distal portion of said conveyor.

3. The return conveyor belt system of claim 1, wherein said upper surface of said table is declined toward a saw for allowing said manipulating member to pass beneath a plurality of ripped segments exiting said saw.

4. The return conveyor belt system of claim 1, wherein said manipulating member has a narrow structure for fitting within a kerf of said ripped segments.

5. The return conveyor belt system of claim 4, wherein said manipulating member moves a plurality of ripped segments onto said conveyor while leaving an undesirable portion of said plurality of ripped segments.

6. The return conveyor belt system of claim 1, wherein said manipulating member automatically moves a plurality of ripped segments onto said conveyor upon receiving said plurality of ripped segments upon said upper surface.

7. The return conveyor belt system of claim 1, including a sensor attached to said conveyor for detecting one or more ripped segments transferred upon said conveyor, wherein said sensor is in communication with said control unit thereby allowing for the termination of movement of a belt of said conveyor.

8. The return conveyor belt system of claim 7, wherein said control unit remains said belt of said conveyor motionless for a period of time after removal of said one or more ripped segments.

9. The return conveyor belt system of claim 8, wherein said period of time is greater than two seconds.

10. The return conveyor belt system of claim 1, including a pair of sheaths attached about said pair of control chains for guiding said pair of control chains.

11. A return conveyor belt system, comprising:

a table having an upper surface;

a manipulating member having an elongate structure slidably extending upon said upper surface of said table;

a means for manipulating said manipulating member;

a conveyor attached to said table for transferring ripped segments of a piece of lumber; and a control unit in communication with said means for manipulating and said conveyor;

wherein said means for manipulating said manipulating member is comprised of:

a plurality of slots within said table;

a plurality of arms extending within said slots and attached to opposing ends of said manipulating member;

a drive shaft having a plurality of drive sprockets, wherein said drive shaft is rotatably positioned within said table and a plurality of idler sprockets are rotatably positioned within said table opposite of said drive shaft;

a drive motor mechanically connected to said drive shaft for rotating said drive shaft; and a plurality of drive members extending about said drive sprockets and said idler sprockets, wherein said control chains are connected to said arms.

12. The return conveyor belt system of claim 11, wherein said conveyor is pivotally attached to said table and said conveyor includes a plurality of legs with a corresponding plurality of wheels attached to a distal portion of said conveyor.

13. The return conveyor belt system of claim 11, wherein said upper surface of said table is declined toward a saw for allowing said manipulating member to pass beneath a plurality of ripped segments exiting said saw.

14. The return conveyor belt system of claim 11, wherein said manipulating member has a narrow structure for fitting within a kerf of said ripped segments.

15. The return conveyor belt system of claim 14, wherein said manipulating member moves a plurality of ripped segments onto said conveyor while leaving an undesirable portion of said plurality of ripped segments.

16. The return conveyor belt system of claim 11, wherein said manipulating member automatically moves a plurality of ripped segments onto said conveyor upon receiving said plurality of ripped segments upon said upper surface.

17. The return conveyor belt system of claim 11, including a sensor attached to said conveyor for detecting one or more ripped segments transferred upon said conveyor, wherein said sensor is in communication with said control unit thereby allowing for the termination of movement of a belt of said conveyor.

18. The return conveyor belt system of claim 17, wherein said control unit remains said belt of said conveyor motionless for a period of time after removal of said one or more ripped segments.

19. The return conveyor belt system of claim 18, wherein said period of time is greater than two seconds.

20. The return conveyor belt system of claim 11, including a plurality of sheaths attached about said drive members for guiding said drive members.

* * * * *